(12) United States Patent
Yang

(10) Patent No.: US 11,662,752 B2
(45) Date of Patent: May 30, 2023

(54) TEMPERATURE-CONTROLLING WATER VALVE

(71) Applicant: Tsai-Chen Yang, Taichung (TW)

(72) Inventor: Tsai-Chen Yang, Taichung (TW)

( * ) Notice: Subject to any disclaimer, the term of this patent is extended or adjusted under 35 U.S.C. 154(b) by 52 days.

(21) Appl. No.: 17/329,606

(22) Filed: May 25, 2021

(65) Prior Publication Data
US 2022/0382303 A1 Dec. 1, 2022

(51) Int. Cl.
| | | |
|---|---|---|
| *G05D 23/13* | (2006.01) | |
| *G05D 23/02* | (2006.01) | |
| *F01M 5/00* | (2006.01) | |
| *F01P 7/16* | (2006.01) | |
| *F16K 31/00* | (2006.01) | |
| *F16K 11/044* | (2006.01) | |
| *F16K 1/42* | (2006.01) | |
| *F16K 1/30* | (2006.01) | |
| *F16K 27/02* | (2006.01) | |
| *F16K 1/36* | (2006.01) | |
| *F16K 17/04* | (2006.01) | |

(52) U.S. Cl.
CPC ........... *G05D 23/134* (2013.01); *F01M 5/007* (2013.01); *F01P 7/16* (2013.01); *F16K 11/044* (2013.01); *F16K 31/002* (2013.01); *G05D 23/022* (2013.01); *G05D 23/1333* (2013.01); *F01P 2060/04* (2013.01); *F01P 2060/045* (2013.01); *F16K 1/302* (2013.01); *F16K 1/36* (2013.01); *F16K 1/42* (2013.01); *F16K 17/04* (2013.01); *F16K 27/02* (2013.01); *Y10T 137/7737* (2015.04)

(58) Field of Classification Search
CPC ............... G05D 23/134; G05D 23/022; G05D 23/1333; F01M 5/007; F01P 7/16; F01P 2060/04; F01P 2060/045; F16K 11/044; F16K 31/002; F16K 1/302; F16K 1/36; F16K 1/42; F16K 17/04; F16K 27/02; Y01T 137/7737
USPC ........................................................ 236/12.15
See application file for complete search history.

(56) References Cited

U.S. PATENT DOCUMENTS

| | | | |
|---|---|---|---|
| 3,949,777 A * | 4/1976 | Caldwell | G05D 23/128 137/271 |
| 2012/0247582 A1* | 10/2012 | Lamb | G05D 23/1333 137/468 |
| 2018/0031134 A1* | 2/2018 | Yang | F16K 11/0782 |

* cited by examiner

*Primary Examiner* — Yi-Kai Wang
(74) *Attorney, Agent, or Firm* — Muncy, Geissler, Olds & Lowe, P.C.

(57) ABSTRACT

A temperature-controlling water valve is provided. An adjusting assembly is assembled within the water valve and includes an adjusting member, a first elastic member, a blocking member and an abutting member. The first elastic member biases the abutting member, and the blocking member is fixed to the adjusting member to block the abutting member from detaching from a receiving hole of the adjusting member. A temperature-controlling assembly includes a valve member and a second elastic member biasing the valve member. Thermal expansion or contraction of a rod member of the valve member drives the valve member to move so that an overlapping area of the valve member and a first passageway of the water valve and an overlapping area of the valve member and a second passageway of the water valve change.

14 Claims, 6 Drawing Sheets

TEMPERATURE-CONTROLLING WATER VALVE

BACKGROUND OF THE INVENTION

Field of the Invention

The present invention relates to a temperature-controlling water valve.

Description of the Prior Art

Generally, hot water in a hot water pipe and cold water in a cold water pipe can be mixed in a chamber and directed into an outlet pipe, and then discharged to be used for washing or bathing. However, in practice, the flow of hot water and cold water are unstable so that the temperature of the mixed water cannot be kept within the range (35 degrees to 42 degrees) suitable for a human body. As the water temperature is too low, it will cause poor effects in use; and as the water temperature is too high, it will easily cause injury to the user.

The present invention is, therefore, arisen to obviate or at least mitigate the above-mentioned disadvantages.

SUMMARY OF THE INVENTION

The main object of the present invention is to provide a temperature-controlling water valve for controlling the temperature of mixed water by thermal deformation.

To achieve the above and other objects, a temperature-controlling water valve is provided, including: a first body, including a chamber, and a first piping, a second piping and a third piping which are in communication with the chamber, a first passageway being disposed between the first piping and the chamber, a second passageway being disposed between the second piping and the chamber between, the third piping being in communication with the chamber; a second body, connected to the first body, including a through hole, the through hole being in communication with an outside and the chamber; an adjusting assembly, including an adjusting member, a first elastic member, a blocking member and an abutting member, the adjusting member being screwed within the through hole, an end of the adjusting member facing inwardly toward the chamber including a receiving hole, the abutting member being slidably disposed within the receiving hole, the first elastic member being abutted between a bottom portion of the receiving hole and the abutting member so as to bias the abutting member in a direction toward the chamber, the blocking member being fixed to the adjusting member to block the abutting member from detaching from the receiving hole; a temperature-controlling assembly, including a valve member and a second elastic member, the valve member movably being disposed in the chamber, the valve member including a base member and a rod member connected with the base member, the base member being disposed between the first passageway and the second passageway, the rod member being abutted against the abutting member, the second elastic member being abutted between the valve member and an inner face of the chamber so as to bias the valve member in a direction toward the second body; wherein thermal expansion or contraction of the rod member drives the valve member to move relative to the chamber so that an overlapping area of the base member and the first passageway and an overlapping area of the base member and the second passageway change.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
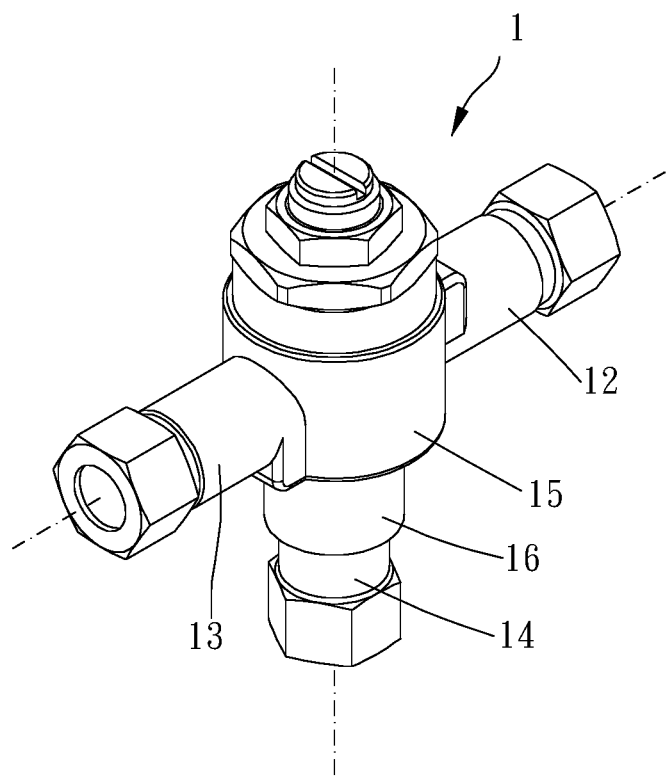
FIG. 1 is a stereogram of a preferable embodiment of the present invention.
Figure 2:
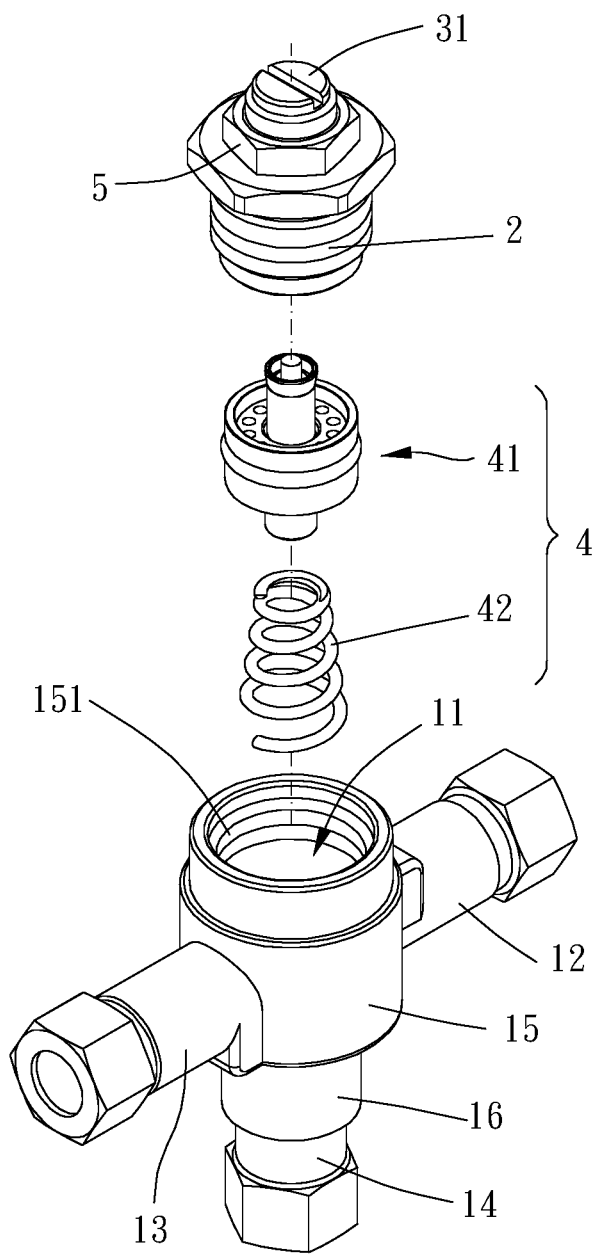
FIG. 2 is a breakdown drawing of a preferable embodiment of the present invention.
Figure 3:
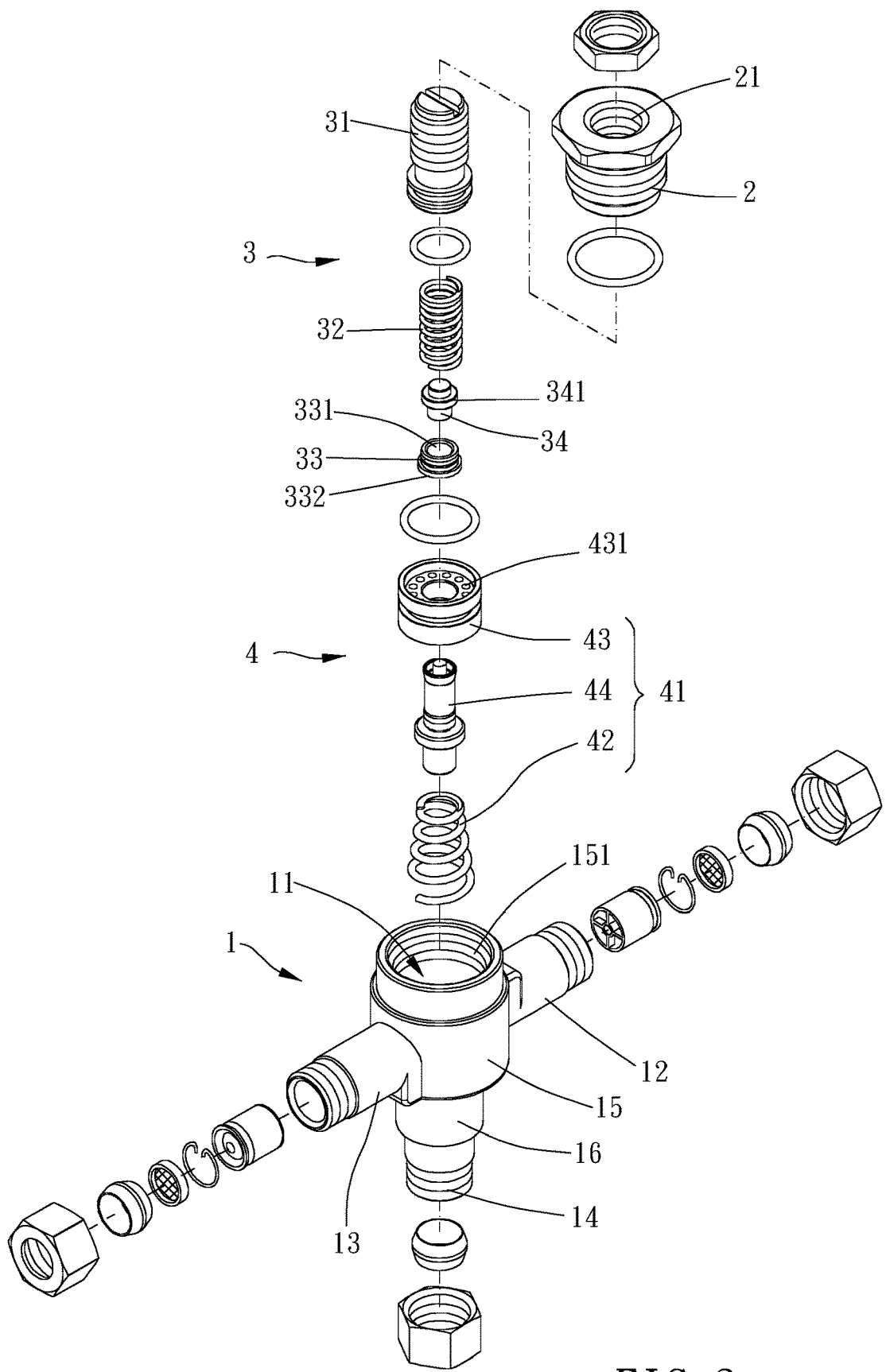
FIG. 3 is another breakdown drawing of a preferable embodiment of the present invention.
Figure 4:
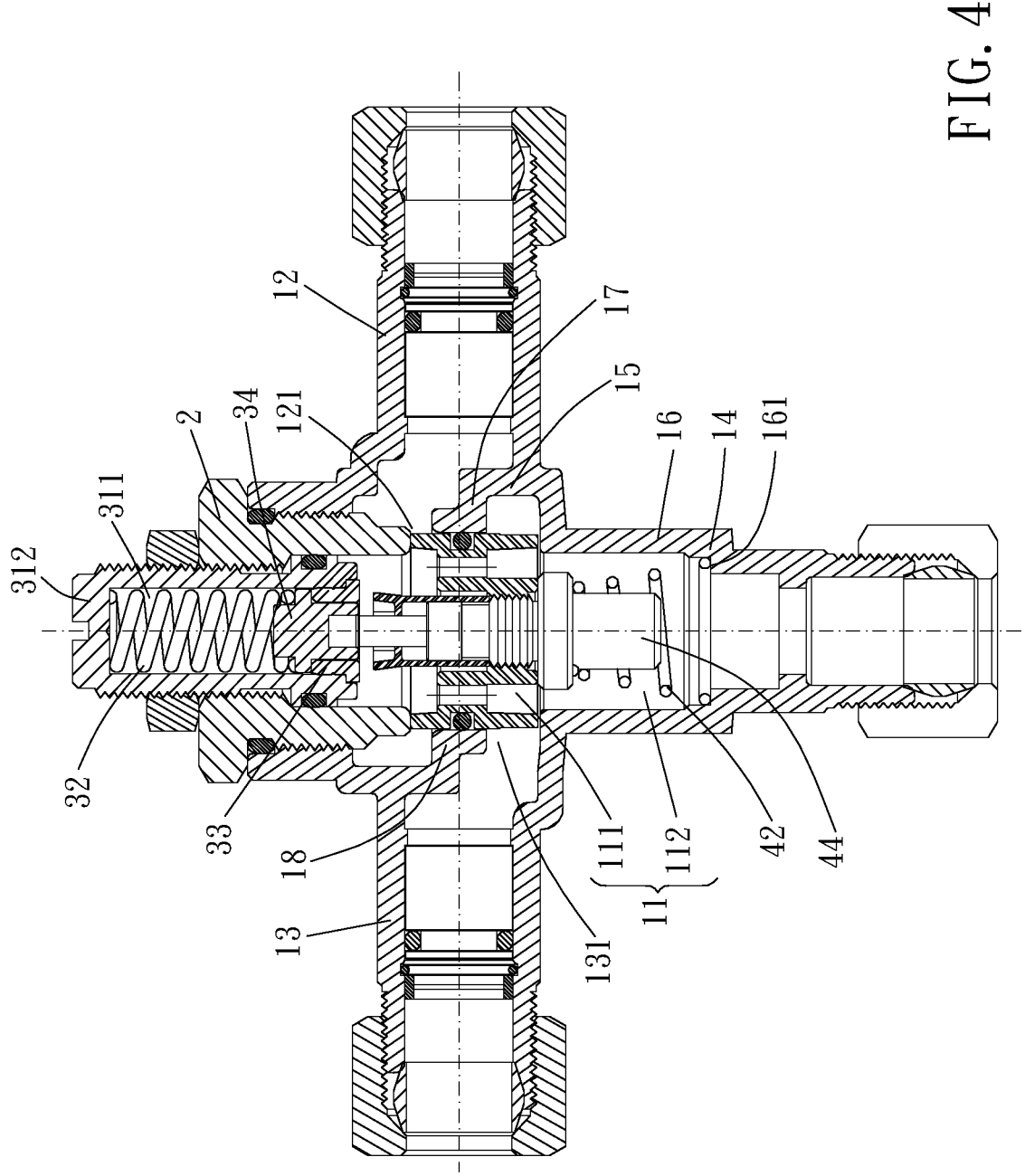
FIG. 4 is a cross-sectional view of FIG. 1.

Please refer to FIGS. 1 to 4 for a preferable embodiment of the present invention. A temperature-controlling water valve of the present invention includes a first body 1, a second body 2, an adjusting assembly 3 and a temperature-controlling assembly 4.

The first body 1 includes a chamber 11, and a first piping 12, a second piping 13 and a third piping 14 which are in communication with the chamber 11. A first passageway 121 is disposed between the first piping 12 and the chamber 11, a second passageway 131 is disposed between the second piping 13 and the chamber 11, and the third piping 14 is in communication with the chamber 11.

The second body 2 is connected to the first body 1 and includes a through hole 21, wherein the through hole 21 is in communication with an outside and the chamber 11.

The adjusting assembly 3 includes an adjusting member 31, a first elastic member 32, a blocking member 33 and an abutting member 34. The adjusting member 31 is screwed within the through hole 21, and an end of the adjusting member 31 facing inwardly toward the chamber 11 includes a receiving hole 311. The abutting member 34 is slidably disposed within the receiving hole 311, and the first elastic member 32 is abutted between a bottom portion of the receiving hole 311 and the abutting member 34 so as to bias the abutting member 34 in a direction toward the chamber 11. The blocking member 33 is fixed to the adjusting member 31 to block the abutting member 34 from detaching from the receiving hole 311.

The temperature-controlling assembly 4 includes a valve member 41 and a second elastic member 42, the valve member 41 movably is disposed in the chamber 11, and the valve member 41 includes a base member 43 and a rod member 44 connected with the base member 43. The base member 43 is disposed between the first passageway 121 and the second passageway 131, the rod member 44 is abutted against the abutting member 34, and the second elastic member 42 is abutted between the valve member 41 and an inner face of the chamber 11 so as to bias the valve member 41 in a direction toward the second body 2.

Thermal expansion or contraction of the rod member 44 drives the valve member 41 to move relative to the chamber 11 so that an overlapping area of the base member 43 and the first passageway 121 and an overlapping area of the base member 43 and the second passageway 131 change.

In this embodiment, the first piping 12 serves as a cold water inlet, the second piping 13 serves as a hot water inlet, and the third piping 14 serves as a mixed water outlet. The rod member 44 becomes longer due to thermal expansion or shorter due to thermal contraction. When the rod member 44 becomes longer due to thermal expansion, since the rod member 44 is abutted against the abutting member 34, the rod member 44 drives the base member 43 to move downward so that the overlapping area of the base member 43 and the first passageway 121 decreases and more amount of water flows through the first passageway 121, and the overlapping area of the base member 43 and the second passageway 131 increases and less amount of water flows through the second passageway 131, which lowers the temperature of the mixed water flowing into the chamber 11, thus achieving temperature controlling. It goes in the similar way when the rod member 44 becomes shorter due to thermal contraction.

Specifically, the first body 1 includes a first portion 15 and a second portion 16 which are axially connected, the first portion 15 defines a first space 111, and the second portion 16 defines a second space 112 in communication with the first space 111. The chamber 11 includes the first space 111 and the second space 112, the first piping 12 and the second piping 13 are in communication with the first space 111, the third piping 14 is in communication with the second space 112, the base member 43 is located within the first space 111, and the rod member 44 extends and is located within the first space 111 and the second space 112.

In this embodiment, the base member 43 includes at least one communication hole 431 extending axially therethrough, and a first abutting portion 17 and a second abutting portion 18 is disposed in the first space 111. The first abutting portion 17 and the second abutting portion 18 are slidably and sealingly abutted radially against a circumferential wall of the base member 43 so that the water can flow through the base member 43 only via the communication hole 431. The first abutting portion 17 and the second abutting portion 18 have respective axial lengths smaller than an axial length of the base member 43.

The second body 2 is disposed at an end of the first portion 15 remote from the second portion 16, and two ends of the base member 43 respectively correspond to the second body 2 and an end of the second portion 16 toward the second body 2. Specifically, the first abutting portion 17 and the second body 2 define the first passageway 121 therebetween, and the second abutting portion 18 and the second portion 16 between define the second passageway 131 therebetween. Preferably, the end of the first portion 15 remote from the second portion 16 includes an opening 151, and the second body 2 is screwed with the opening 151, which is easy to assemble/disassemble.

Preferably, the second portion 16 and the third piping 14 are connected and form a first shoulder 161, and the second elastic member 42 is abutted between the first shoulder 161 and the rod member 44. By expansion/contraction of the rod member 44, the first elastic member 32 and the second elastic member 42, the rod member 44 and the base member 43 are retained in position and recoverable.

Specifically, the blocking member 33 includes a perforation 331 extending therethrough, and an end of the blocking member 33 toward the valve member 41 includes a first flange 332 extending radially. A diametric dimension of the first flange 332 is larger than a diametric dimension of the receiving hole 311 for positioning the blocking member 33 at and end of the receiving hole 311, and a portion of the abutting member 34 extends within the perforation 331 so that the rod member 44 abuts the abutting member 34. Preferably, the abutting member 34 includes a second flange 341 extending radially, and a diametric dimension of the second flange 341 is larger than a diametric dimension of the perforation 331. The adjusting member 31 includes a top wall 312, and the first elastic member 32 is abutted between the second flange 341 and the top wall 312 so that the abutting member 34 is biased in a direction toward the rod member 44 and so that the second flange 341 blocks the abutting member 34 form detaching from the receiving hole 311.

The adjusting member 31 is rotated to drive the adjusting member 31 move relative to the second body 2 so as to adjust the relative spatial relationship of the abutting member 34 and the second body 2 so that the position of the base member 43 is changed by the rod member 44, and the flow rates of the cold and hot water are controlled and so is the water temperature.

Figure 5:
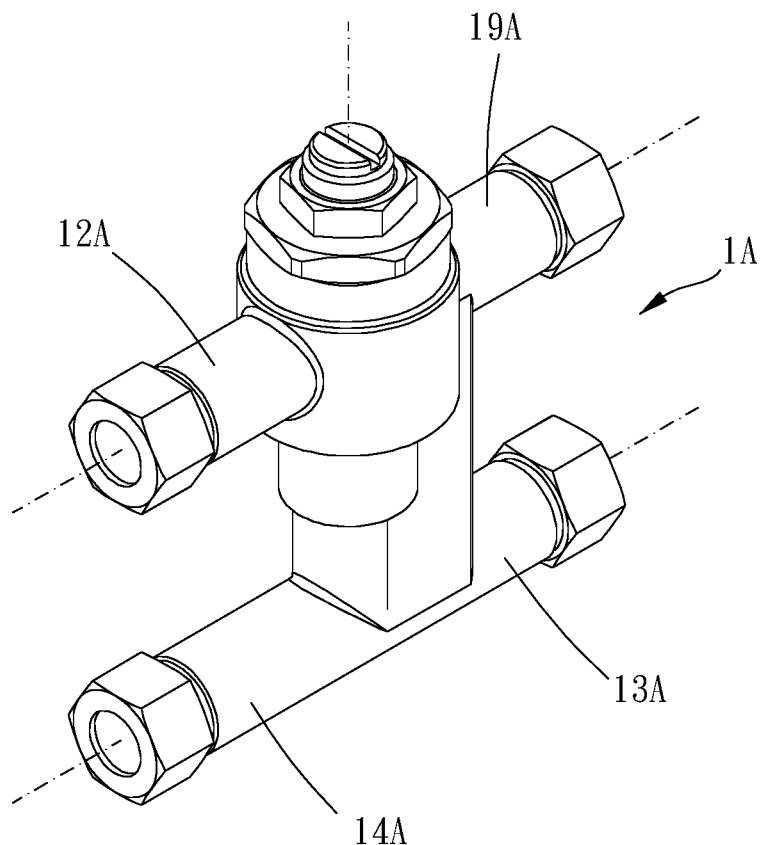
FIG. 5 is a stereogram of another preferable embodiment of the present invention.
Figure 6:
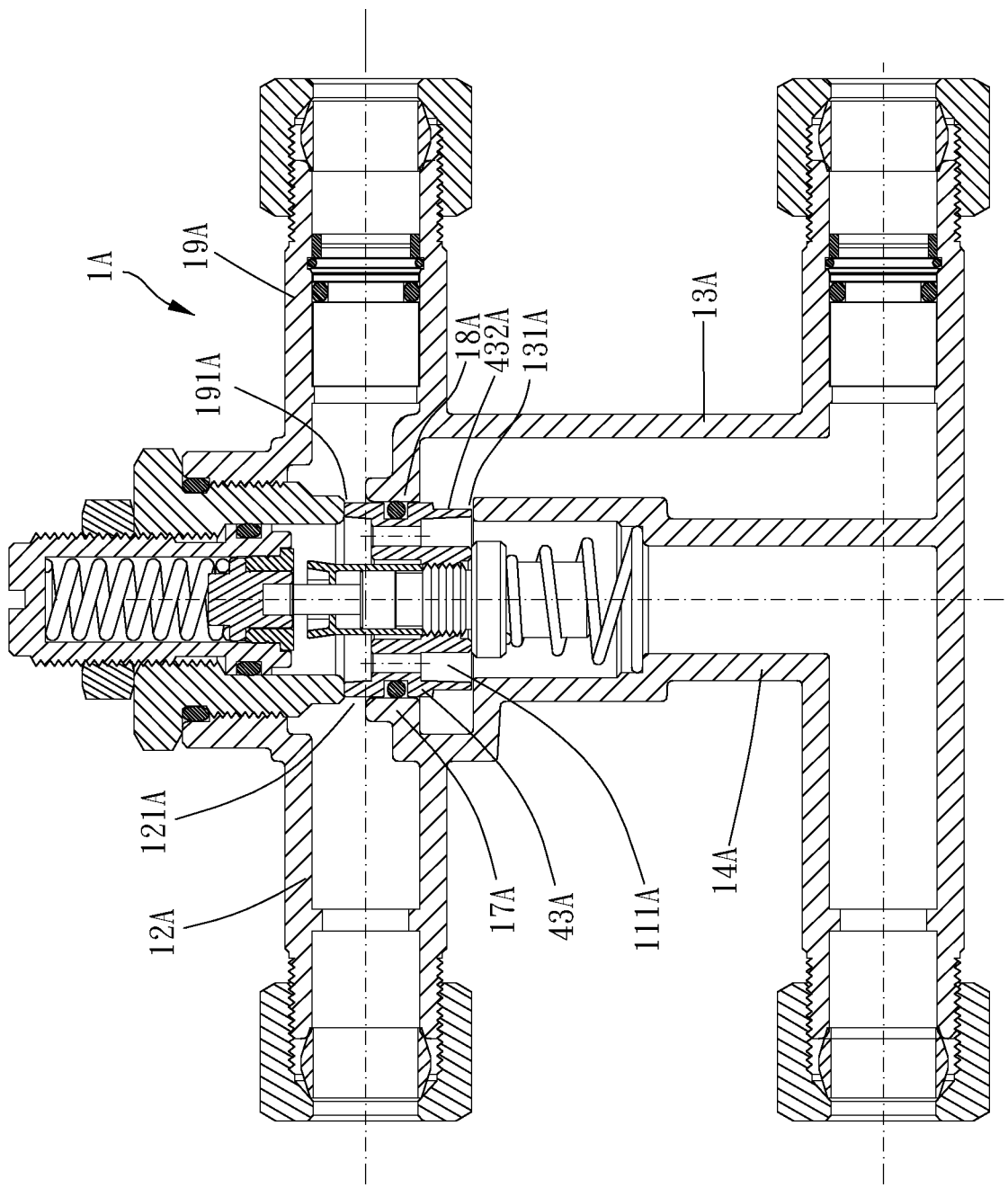
FIG. 6 is a cross-sectional view of FIG. 5.

As shown in FIGS. 5 and 6, in another exemplary embodiment, the first body 1A further includes a fourth passageway 19A, the fourth passageway 19A is in communication with first space 111A, and a third passageway 191A is disposed between the fourth passageway 19A and the first space 111A. In this embodiment, the second abutting portion 18A and the second body 2 define the third passageway 191A therebetween, the first piping 12A and first abutting portion 17A define the first passageway 121A, and the second piping 13A and the second abutting portion 18A define the second passageway 131A, wherein the third piping 14A is adjacent and partially parallel to the second piping.

Preferably, a circumferential wall of at least one end of the base member 43A includes an annular recess 432A. In this embodiment, only one end of the base member 43A is provided with the recess 432A, and the recess 432A is adjacent to the second piping 13A. The recess 432A can prevent turbulence of water in the second piping 13A. The temperature-controlling water valve further includes a nut 5, wherein the nut 5 is screwed to the adjusting member 31 and abutted against the second body 2.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A temperature-controlling water valve, including:
   a first body, including a chamber, and a first piping, a second piping and a third piping which are in communication with the chamber, a first passageway being disposed between the first piping and the chamber, a second passageway being disposed between the second piping and the chamber between, the third piping being in communication with the chamber;
   a second body, screwed to and within the first body, including a through hole, the through hole being in communication with an outside and the chamber;
   an adjusting assembly, including an adjusting member, a first elastic member, a blocking member and an abutting member, the adjusting member being screwed within the through hole, an end of the adjusting member facing inwardly toward the chamber including a receiving hole, the abutting member being slidably disposed within the receiving hole, the first elastic member being abutted between a bottom portion of the receiving hole and the abutting member so as to bias the abutting member in a direction toward the chamber, the blocking member being fixed to the adjusting member to block the abutting member from detaching from the receiving hole;

a temperature-controlling assembly, including a valve member and a second elastic member, the valve member movably being disposed in the chamber, the valve member including a base member and a rod member connected with the base member, the base member being disposed between the first passageway and the second passageway, the rod member being abutted against the abutting member, the second elastic member being abutted between the valve member and an inner face of the chamber so as to bias the valve member in a direction toward the second body;

wherein thermal expansion or contraction of the rod member drives the valve member to move relative to the chamber so that an overlapping area of the base member and the first passageway and an overlapping area of the base member and the second passageway change.

2. The temperature-controlling water valve of claim 1, wherein the first body includes a first portion and a second portion which are axially connected, the first portion defines a first space, the second portion defines a second space in communication with the first space, the chamber includes the first space and the second space, the first piping and the second piping are in communication with the first space, the third piping is in communication with the second space, the base member is located within the first space, and the rod member is located within the first space and the second space.

3. The temperature-controlling water valve of claim 2, wherein the base member includes at least one communication hole extending axially therethrough, a first abutting portion and a second abutting portion is disposed in the first space, the first abutting portion and the second abutting portion are slidably and sealingly abutted radially against a circumferential wall of the base member, and the first abutting portion and the second abutting portion have respective axial lengths smaller than an axial length of the base member.

4. The temperature-controlling water valve of claim 2, wherein the second body is disposed at an end of the first portion remote from the second portion, and two ends of the base member respectively correspond to the second body and an end of the second portion toward the second body.

5. The temperature-controlling water valve of claim 4, wherein the first abutting portion and the second body define the first passageway therebetween, and the second abutting portion and the second portion define the second passageway therebetween.

6. The temperature-controlling water valve of claim 4, wherein the end of the first portion remote from the second portion includes an opening, and the second body is screwed with the opening.

7. The temperature-controlling water valve of claim 4, wherein the second portion and the third piping are connected and form a first shoulder, and the second elastic member is abutted between the first shoulder and the rod member.

8. The temperature-controlling water valve of claim 1, wherein the blocking member includes a perforation extending therethrough, an end of the blocking member toward the valve member includes a first flange extending radially, a diametric dimension of the first flange is larger than a diametric dimension of the receiving hole, and a portion of the abutting member extends within the perforation.

9. The temperature-controlling water valve of claim 8, wherein the abutting member includes a second flange extending radially, a diametric dimension of the second flange is larger than a diametric dimension of the perforation, the adjusting member includes a top wall, and the first elastic member is abutted between the second flange and the top wall.

10. The temperature-controlling water valve of claim 3, wherein the second body is disposed at an end of the first portion remote from the second portion, and two ends of the base member respectively correspond to the second body and an end of the second portion toward the second body; the first abutting portion and the second body define the first passageway therebetween, and the second abutting portion and the second portion define the second passageway therebetween; the end of the first portion remote from the second portion includes an opening, and the second body is screwed with the opening; the second portion and the third piping are connected and form a first shoulder, and the second elastic member is abutted between the first shoulder and the rod member; the blocking member includes a perforation extending therethrough, an end of the blocking member toward the valve member includes a first flange extending radially, a diametric dimension of the first flange is larger than a diametric dimension of the receiving hole, and a part of the abutting member extends within the perforation; the abutting member includes a second flange extending radially, a diametric dimension of the second flange is larger than a diametric dimension of the perforation, the adjusting member includes a top wall, and the first elastic member is abutted between the second flange and the top wall.

11. The temperature-controlling water valve of claim 2, wherein the first body further includes a fourth passageway, the fourth passageway is in communication with the first space, and a third passageway is disposed between the fourth passageway and the first space.

12. The temperature-controlling water valve of claim 11, wherein the second abutting portion and the second body define the third passageway therebetween.

13. The temperature-controlling water valve of claim 4, wherein a circumferential wall of at least one end of the base member includes an annular recess.

14. The temperature-controlling water valve of claim 1, further includes a nut, wherein the nut is screwed to the adjusting member and abutted against the second body.

* * * * *